(12) United States Patent
Zapf

(10) Patent No.: US 6,336,470 B1
(45) Date of Patent: Jan. 8, 2002

(54) DIRECTIONAL SEAT VALVE

(75) Inventor: Friedrich Zapf, Karlstadt (DE)

(73) Assignee: Hydraulik-Ring GmbH, Limbach-Oberfrohna (DE)

( * ) Notice: Subject to any disclaimer, the term of this patent is extended or adjusted under 35 U.S.C. 154(b) by 0 days.

(21) Appl. No.: 09/510,545

(22) Filed: Feb. 22, 2000

(30) Foreign Application Priority Data

Feb. 22, 1999 (DE) .......................................... 199 07 537
Feb. 26, 1999 (DE) .......................................... 199 08 440

(51) Int. Cl.$^7$ ............................................ F15B 13/044
(52) U.S. Cl. .............................. 137/625.65; 251/129.14
(58) Field of Search ................. 137/625.65; 251/129.14

(56) References Cited

U.S. PATENT DOCUMENTS

| | | | |
|---|---|---|---|
| 4,610,267 A | * | 9/1986 | Beck et al. .......... 251/129.14 X |
| 5,950,984 A | * | 9/1999 | Anderson et al. ...... 251/129.14 |

FOREIGN PATENT DOCUMENTS

| | | |
|---|---|---|
| CH | 664 428 | 2/1988 |
| DE | 35 03 785 | 8/1986 |
| DE | 35 27 995 | 2/1987 |
| DE | 34 28 061 | 11/1989 |
| DE | 40 03 606 | 12/1990 |
| DE | 43 11 347 | 10/1994 |
| DE | 43 32 368 | 3/1995 |
| DE | 44 26 110 | 1/1996 |
| DE | 43 01 308 | 4/1996 |
| DE | 43 24 533 | 4/1996 |
| DE | 197 10 353 | 9/1998 |
| DE | 197 27 654 | 1/1999 |
| GB | 2 230 842 | 10/1990 |

OTHER PUBLICATIONS

Yoshio Takada, Manufacture of Pressure Control Valve, Patent Abstracts of Japan, Aug. 2, 1994, vol. 18, No. 411 (6–117549).

* cited by examiner

Primary Examiner—Gerald A. Michalsky
(74) Attorney, Agent, or Firm—Gudrun E. Huckett

(57) ABSTRACT

A directional seat valve has a valve housing having a pressure connector for supplying a pressure medium to the valve housing, a tank connector for returning the pressure medium to a pressure medium tank, and a working connector for supply the pressure medium to a working device. A valve bore is arranged in the valve housing, and the shaped parts each having a valve seat are press-fit into the valve bore. A valve body is arranged in the valve bore and cooperates with the valve seats for controlling flow of the pressure medium from the pressure connector to the tank connector and the working connector. When assembling the directional seat valve, the first shaped part with the first valve seat is press-fit into the valve bore and the press-fit insertion depth in the valve bore is selected based on the position of the armature push rod. Subsequently, the valve body is inserted into the valve bore, and then the second shaped part with the second valve seat is press-fit into the valve bore, wherein the press-fit insertion depth of the second shaped part in the valve bore is selected based on the position of the armature push rod.

11 Claims, 4 Drawing Sheets

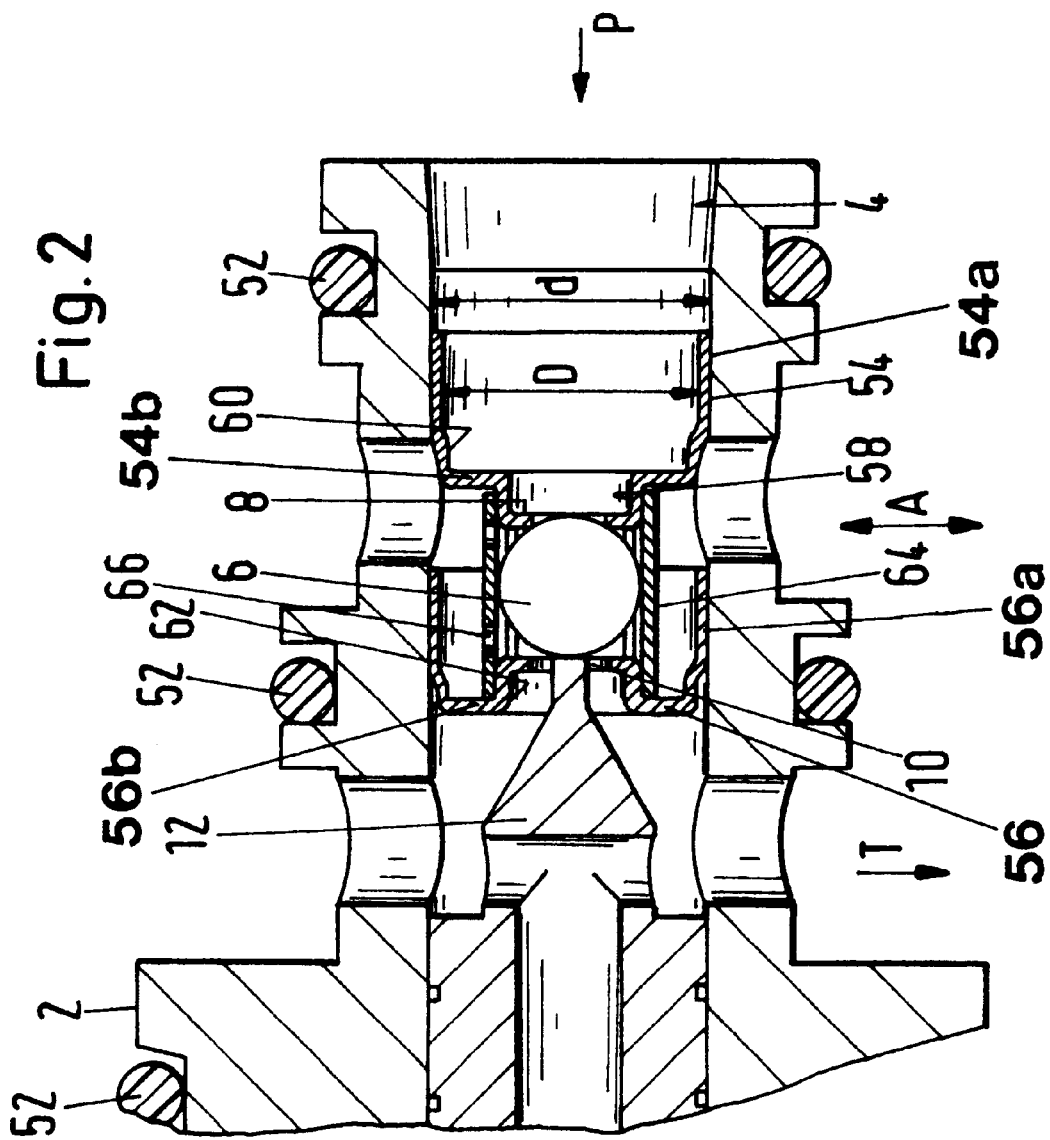

DIRECTIONAL SEAT VALVE

BACKGROUND OF THE INVENTION

1. Field of the Invention

The invention relates to a directional seat valve comprising a valve body which is arranged in a valve bore and biased against at least one valve seat. It is lifted off the valve seat for connecting a pressure connector to a tank connector or a work connector. The invention furthermore relates to a method for assembling such a directional seat valve.

2. Description of the Related Art

Such directional seat valves have a valve housing with an axial bore in which a valve body is moveably arranged. The valve body is biased by a pressure spring against the valve seat. Upon surpassing a predetermined pressure at the inlet connector, the valve body is lifted off the valve seat and moved into an opening position in which the inlet connector is connected to an outlet connector, for example, a work connector or a tank connector.

In the publication "Der Hydraulik Trainer", vol. 1, Mannesmann Rexrodt GmbH, 1991, p. 203, a directional seat valve is described in which one valve body has correlated therewith two valve seats so that, depending on the position of the valve body, the inlet or pressure connector is connected to a working connector or the working connector is connected to the tank connector. This valve is provided with negative overlap so that in an intermediate position, in which the valve body is resting neither against one nor the other valve seat, all three connectors communicate with one another.

In particular, directional seat valves with smaller nominal diameter are generally directly controlled by a mechanically acting device, for example, a solenoid so that the valve body can be brought into a predetermined switching position or can be maintained in it.

The problem with such directional seat valves is that the magnetic operating point of the solenoid must be adjusted relatively precisely to the axial position of the valve seat so that switching of the solenoid acts without play and without delay onto the valve body.

This means that the components of the mechanical connecting chain between the solenoid and the valve body must be exactly adjusted with respect to their tolerances to the magnetic operating point of the solenoid.

SUMMARY OF THE INVENTION

It is therefore an object of the present invention to provide a directional seat valve and a method for assembling the directional seat valve in which the process-technological and assembly-technological expenditures are reduced in comparison to conventional solutions.

In accordance with the present invention, this is achieved for the directional seat valve in that the valve seat is provided on a shaped part which is inserted with press-fit into the valve bore.

The directional seat valve according to the present invention comprises: a valve housing having a pressure connector configured to supply a pressure medium to the valve housing, a tank connector configured to return the pressure medium to a pressure medium tank, and a working connector configured to supply the pressure medium to a working device; a valve bore arranged in the valve housing; one or more shaped parts each configured to be press-fit into the valve bore and each having a valve seat; a valve body arranged in the valve bore and configured to cooperate with the valve seat of the one or more shaped parts for controlling flow of the pressure medium from the pressure connector to at least one of the tank connector and the working connector.

Moreover, in accordance with the present invention, this is achieved in connection with the method in that the first shaped part is press-fit into the valve bore for forming the first valve seat, wherein the press-fit insertion depth is selected depending on the position of the solenoid armature push rod; the valve body is then inserted; and the second shaped part is subsequently press-fit into the valve bore for forming the second valve seat, wherein the press-fit insertion depth is again selected depending on the position of the armature push rod.

The method according to the present invention for assembling a directional seat valve actuated by an armature push rod of a solenoid comprises the steps of: press-fitting a first shaped part with a first valve seat into a valve bore and selecting a press-fit insertion depth in the valve bore based on a position of an armature push rod; inserting a valve body into the valve bore; and press-fitting a second shaped part with a second valve seat into the valve bore and selecting a press-fit insertion depth of the second shaped part in the valve bore based on the position of the armature push rod.

With the directional seat valve according to the invention the valve seat body is realized by a shaped part which is inserted with press-fit into a valve bore of the valve housing. The press-fit insertion depth depends on the actual magnetic operating point of the employed solenoid so that an optimal response of the valve to the switching of the solenoid is ensured. The press-fit insertion depth can be adjusted according to the invention, for example, by suitable tools which are provided with stops determining the press-fit insertion depth. Upon insertion of the shaped parts by means of the tools, the stop of the tools can be brought into contact with the armature push rod. Due to the exact correlation between the magnetic operating point and the position of the valve seat, it is no longer required to provide a linearization of the solenoid used for switching the directional seat valve so that the configuration of the inventive directional seat valve is further simplified.

The inventive configuration of the valve seat in the form of a shaped part inserted with press-fit into the valve bore can be employed especially advantageously for so-called single ball valves in which the valve body is arranged between two valve seats so that, depending on the control action, the three connectors can communicate with one another in a predetermined connecting pattern.

The control action for the valve body is preferably realized by a solenoid. In an especially preferred embodiment, the valve body is biased against one of the valve seats by a push rod of the solenoid that is acted on by a pressure spring. Upon actuation of the solenoid, the push rod is lifted off the valve body against the force of the pressure spring so that the valve body can be moved against the other valve seat.

The manufacture and assembly of the shaped part are especially simple when the shaped part is deep-drawn from sheet metal. The outer diameter of the shaped part, which is expediently cup-shaped, is preferably selected such that it is over-sized relative to the valve bore so that the shaped part can be inserted with press-fit.

The configuration of the valve seat in the shaped part is especially simple when in the bottom of the cup-shaped part an outwardly or inwardly projecting portion is formed which is provided with a penetration forming the valve seat.

Inventively, this valve seat is fine-machined by stamping with a valve body having a diameter that is greater than that of the actually employed valve body so that a precise contact and seat surface for the valve body is provided.

For a single ball valve the valve body is preferably guided by a guide sleeve which is positioned between the two press-fit shaped parts and which prevents a radial deflection of the valve body. In this way, a safe sealing and closure of the valve seat is ensured.

The two shaped parts for a single ball valve are preferably configured such that they can be inserted into the valve bore from one end of the valve housing and have substantially the same orientational position, i.e., are pointed with their cup bottom toward the solenoid. In order to facilitate inflow and outflow through radial connectors of the valve housing, the shaped parts are radially stepped so that the pressure medium flow to the valve seat is facilitated. The push rod of the solenoid is designed preferably such that it penetrates the neighboring valve seat and biases the valve body in the direction toward the other (remote) valve seat.

The valve housing can have an especially compact configuration when the coil member of the solenoid is radially widened toward the valve portion so that a projecting end portion of the valve housing can be inserted into the radially widened portion.

Other advantageous embodiments of the invention will become apparent from the following detailed description.

BRIEF DESCRIPTION OF THE DRAWING

In the drawing:

FIG. 2 is a detail view of the directional seat valve of FIG. 1;

FIG. 3 is a detail view of a valve seat of the directional seat valve of FIG. 1;

DESCRIPTION OF THE PREFERRED EMBODIMENTS

Figure 1:
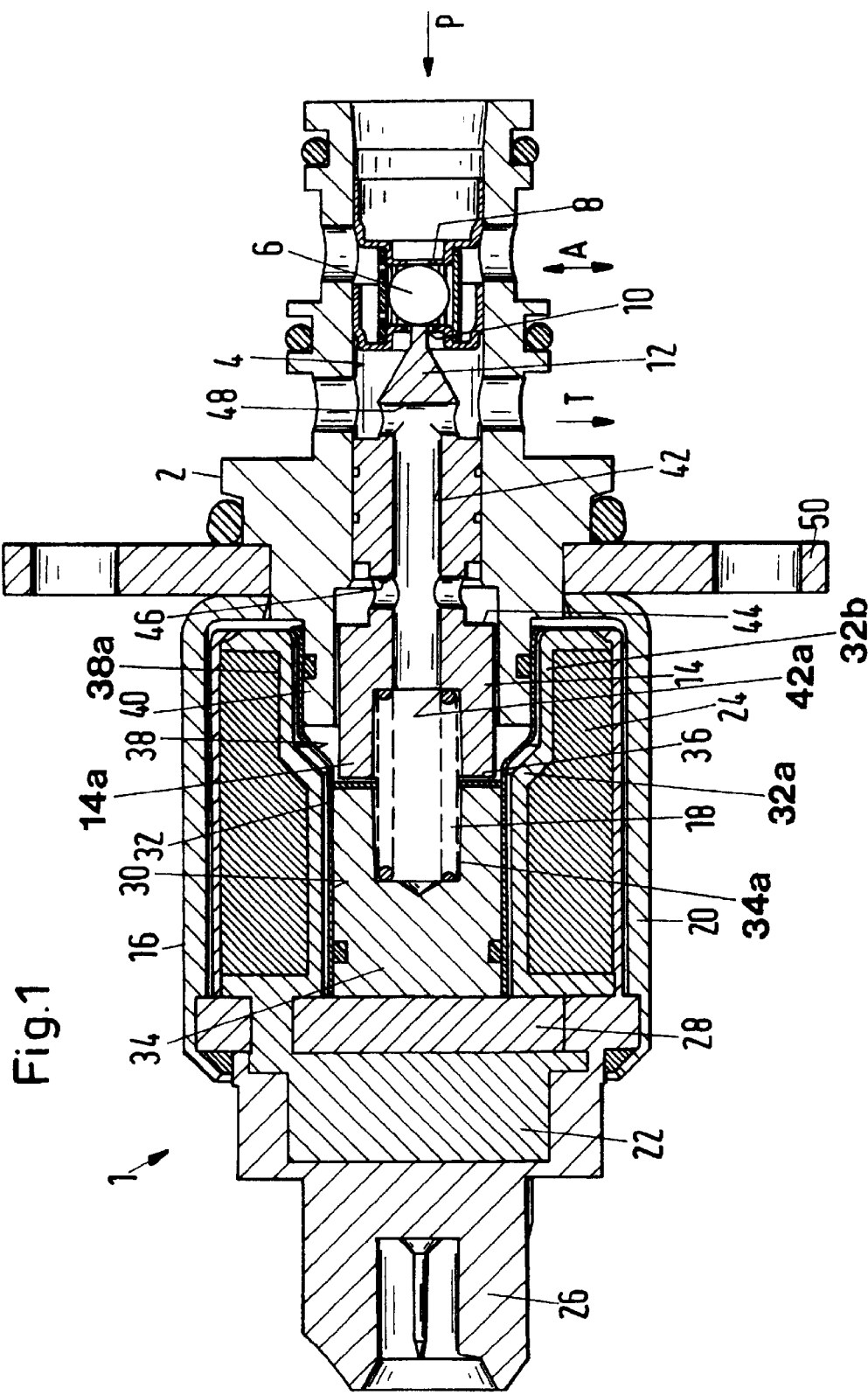
FIG. 1 is a section view of a directly controlled directional seat valve according to the present invention.

FIG. 1 shows a section of a directly controlled 3/2 directional seat valve 1 (the designation 3/2 refers to the number of connectors available, i.e., three, and the number of connectors, i.e., two, to be respectively connected for operation). It has a cartridge configuration with a valve housing 2 having a valve bore 4 into which a pressure connector P, a working connector A, and a tank connector T open. The pressure connector P opens axially into the valve bore 4, while the two connectors A and T are embodied as radial star bores. The 3/2 directional seat valve 1 is a so-called single ball valve and has a valve body 6 correlated with two valve seats 8, 10. These valve seats 8, 10 will be described in more detail at a later point.

The base position represented in FIG. 1 shows the valve body 6 being pushed by a push rod 12 against the valve seat 8 to the right in FIG. 1. This push rod 12 is a unitary (monolithic) part of the armature 14 of a solenoid 16 and is biased by a pressure spring 18 into its contact position against the valve body 6.

The solenoid 16, which will be explained in more detail in the following, is embodied as a pulling magnet so that the solenoid 16 will lift the push rod 12 off the valve body 6 against the force of the pressure spring 18 when supplied with current.

The solenoid 16 has a deep-drawn housing 20 in which the coil member 22 with its coil 24 is mounted.

The coil member 22 has a plug-in 26 at one end portion (to the left in FIG. 1) for supplying current to the solenoid 16. A metal disc 28 is embedded by injection molding into the coil member 22.

According to FIG. 1, the coil member 22 has an axial recess 30 that opens at its right end face and receives a tube 32. This tube 32 receives a pole core (magnet core) 34 having one end face resting against the metal disc 28 and having a leaf or thin plate 36 made of a magnetically non-conducting material provided at its other end face. The magnet core 34 is seal tight inserted into the tube 32. An axial blind bore 43a, having an inner end face against which the pressure spring 18 is resting, is provided in the right end portion of the pole core 34, as shown in FIG. 1.

As can be seen also in FIG. 1, the tube 32 and the coil member 22 are radially widened in the area of the leaf 36, beginning with the slanted shoulders 38 and 32a. The radially widened portions 38a, 32b of the coil member 22 and of the tube 32 are provided for receiving a projecting end portion 40 of the valve housing 2 by which the valve housing 2 is connected to the solenoid 16, i.e., more precisely, to the coil member 22 and the solenoid housing 20.

The armature 14 is guided in the axial bore 4 penetrating the valve housing 2 and has a radially widened end portion 14a facing the pole core 34. The radially widened end portion 14a of the armature 14 is guided with play in the axial bore 4. The armature 14 is penetrated by a central bore 42 which widens in the direction toward the left end face in FIG. 1. The pressure spring 18 engages the annular end face 42a provided by the widened portion of the bore 42.

In the area of the radially widened portion 14a of the armature 14 an annular groove 44 with radial bores 46 opening into the central bore 42 is provided. The armature 14 is tapered at the end portion facing the valve seats 8, 10, and this tapered end portion defines the push rod 12. In this tapered portion a transverse bore 48 is provided in which the central bore 42 ends. The transverse bore 48 opens approximately in the area of the tank connector T into the valve bore 4.

The spring chamber for receiving the pressure spring 18 and the space defined by the annular groove 44 and the neighboring circumferential wall of the valve housing 2 are connected via the bores 42, 46, 48 and the tank connector T to the pressure medium tank or reservoir so that in these areas only a negligible tank pressure is built up but lubrication of the movable parts of the solenoid 16 is ensured.

Instead of the bores 42, 46, 48, longitudinal grooves can be provided at the outer circumference of the armature 14 in order to connect the spring chamber to the tank connector T.

The attachment of the directional valve 1 of FIG. 1 to a housing is realized by the fastening flange 50.

The hydraulic portion of the solenoid-operated directional valve 1 is represented in FIG. 2 on an enlarged scale. Three O-rings 52 are arranged at the outer circumference of the valve housing 2 for a seal tight arrangement of the connectors P, A, and T relative to one another. The two valve seats 8, 10 for the ball-shaped valve body 6 are inventively embodied as two deep-drawn shaped parts which in first approximation are basket or cup-shaped. The valve seat 8 is provided at the first shaped part 54, and the valve seat 10 is provided at the second shaped part 56. The shaped parts 54, 56 are deep-drawn sheet metal parts, preferably sheet steel parts, which have a basket-shaped or a cup-shaped configuration with a cup bottom 54b, 56b and a cup sidewall 54a, 56a. The outer diameter D of the shaped parts 54, 56 is slightly greater than the diameter d of the valve bore 4 (see FIG. 2) so that the shaped parts 54, 56 are inserted with press-fit into the valve bore 4.

In principle, the shaped parts could also be fastened in other ways known to a person skilled in the art to the valve bore 4.

The first shaped part 54 represented to the right in FIG. 2 has a hub-shaped outwardly projecting portion 58 at the cup bottom 54b. The bottom of the outwardly projecting portion 58 is provided with the valve seat 8 that is in the form of an axial penetration. As can be seen also in FIG. 2, the first shaped part 54 tapers via a slanted wall 60 in the area of the working connector A.

According to FIG. 2, the curved slanted wall 60 is arranged such that the flow between the working connector A and the valve bore 4 is deflected toward the valve seats 8, 10 so that the flow resistance is reduced. Moreover, the slanted wall 60 simplifies the manufacture (deep drawing) and the insertion of the shaped parts 54, 56.

The second shaped part 56 has in general the same configuration as the first shaped part 54, wherein at the cup bottom 56b (the left end face in FIG. 2) of the shaped part 56 an inwardly projecting portion 62 is formed instead of the outwardly projecting portion 58 of the shaped part 54. Accordingly, the hub-shaped projection according to this embodiment formed by the inwardly projecting portion 62 extends into the interior of the basket-shaped or cup-shaped part 56 while the outwardly projecting portion 58 of the first shaped part 54 projects away from the cup bottom 54b and the interior of the cup-shaped part 54.

The inwardly projecting portion 62 and the outwardly projecting portion 58 have the same outer diameter and support, as shown in FIG. 2, a plastic sleeve 64. The plastic sleeve 64 engages with one end the inwardly projecting portion 62 and with the oppositely arranged end the outwardly projecting portion 58. The plastic sleeve 64 provides an axial guiding action for the valve body 6. The valve body 6 is received with play in the interior of the plastic sleeve 64 so that flow past the valve body 6 is possible within the plastic sleeve 64. The wall of the plastic sleeve 64 is provided with penetrations 66 so that the pressure medium can pass into the interior of the plastic sleeve 64.

The plastic sleeve 64 prevents the lateral deflection of the valve body 6 so that an axial orientation with respect to the valve seats 8,10 is realized. Such a radial deflection of the valve body can occur in unfavorable operating conditions. This could be, for example, the case when at the connector P no or only minimal pressure is present so that the valve body is not secured by pressure medium flow about its circumference in its radial position. If no plastic sleeve 64 were present, a radial deflection of the valve body 6 could result also for accelerations occurring perpendicularly to the valve axis.

The press-fit insertion depth of the two shaped parts 54, 56 into the valve bore 4 depends on the magnetic operating point of the solenoid 16. Therefore, the magnetic operating range of the solenoid 16 is determined by a series of experiments before assembly of the inventive directional valve 1, and as a function of the experimentally determined operating range the press-fit insertion depth is determined. With this measure it is ensured that the solenoid 16 is controlled within an optimal operating range so that a fast response of the valve is ensured.

Based on the minimal stroke of the armature 14 and the exact determination of the position of the valve seats 8, 10 relative to the magnetic operating range, it is no longer needed to provide a partial linearization of the characteristic line of the solenoid 16. Such a partial linearization can be achieved, for example, by of radial deflection of the magnetic field lines which cause, in turn, the presence of forces acting in the radial direction. This means that such a partial linearization requires, on the one hand, a more complex configuration of the solenoid and, on the other hand, results in forces acting in the radial direction onto the armature and the valve body. This decreases the response behavior of conventional directional valves in comparison to the solution according to the present invention without partial linearization.

Figure 4:
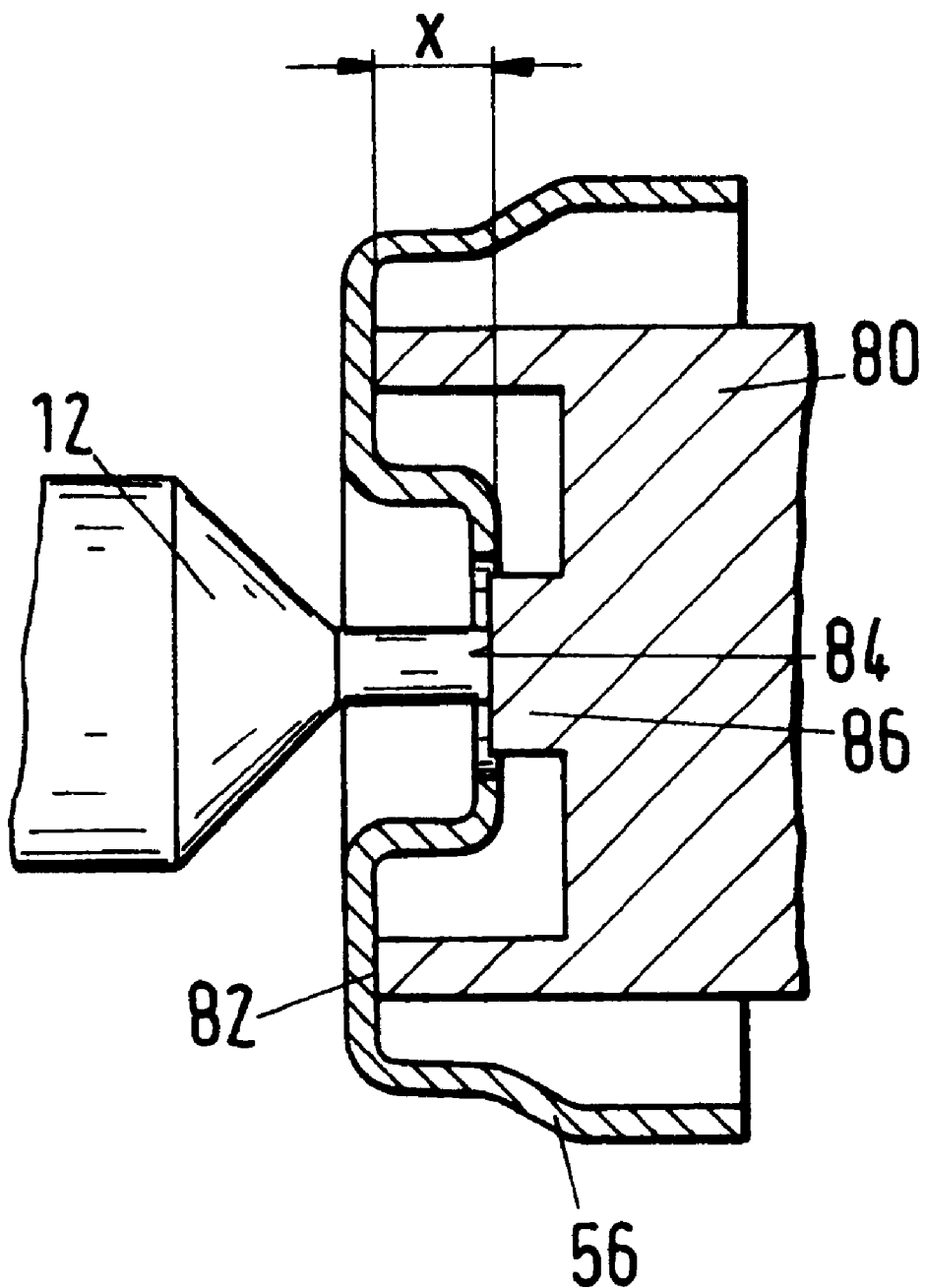
FIG. 4 is a representation of a tool for correctly positioning the valve seat.

According to FIG. 4, suitable tools 80 are provided for the insertion of the two shaped parts 54, 56. The tool 80 for insertion of the shaped part 56 positioned adjacent to the push rod is provided at its end face with a circumferential annular collar 82 which can be brought into contact against the inner end face of the shaped part 56. The adjustment of the press-fit insertion depth is realized by a contact surface 84 of the centrally arranged adjusting pin 86 which can be brought into contact at the end face of the armature push rod 12. The axial spacing X of the end face of the annular collar 82 to the contact surface 84 determines thus the press-fit insertion depth of the shaped part 56. In this way, the tool 80 forces the shaped part 56 into the axial bore 4 until the abutment or contact surface 84 comes to rest against the push rod 12. In this way, manufacturing tolerances of the solenoid can be simply compensated with a corresponding machining of the tool 80. The insertion of the shaped part 54 is then realized either as a function of the axial position of the shaped part 56 or by a tool, embodied according to the representation of FIG. 4, as a function of the actual position of the armature push rod 12 wherein the adjusting pin 86 projects axially past the annular collar 82.

During assembly, first the second shaped part 56 is placed onto the corresponding tool 80 and is then brought into the desired press-fit position. Subsequently, the plastic sleeve 64 and the valve body 6 are inserted, and the second shaped part 54 is then press-fit into the valve bore 4 with a further tool 80. The press-fit insertion depth is determined again by a suitable design of the tool 80.

FIG. 3 shows an enlarged representation of the valve seat 8 of the first shaped part 54. As can be seen in the Figure, the valve seat 8 has a contact surface 72 which is produced by stamping with a stamping member 74 (represented by dashed lines in FIG. 3), for example, a valve body with a greater diameter than the valve body 6 of the directional valve. With this pre-stamping action the roundness of the valve seat 8 (10) is ensured.

When no current is supplied to the coil 24, the valve body 6 is biased by the push rod 12, the armature 14, and the pressure spring 18 against the valve seat 8 so that the connection from the pressure connector P to the working connector A is interrupted. In this position, represented in FIGS. 1 and 2, the valve body 6 is lifted off the valve seat 10 so that the connection from the working connector A to the tank connector T is open. The pressure spring 18 is configured such that the valve body 6, upon surpassing a maximum pressure, is lifted off the valve seat 8 so that a pressure limitation function is realized. Upon lifting of the valve body 6 from the valve seat 8, initially all three connectors P, A, and T communicate with one another.

When current is supplied to the solenoid 16, a magnetic field is built up that causes an axial movement of the armature 14 to the left in the representation of FIG. 1. The field lines of the magnetic field penetrate the deep-drawn housing 20, the disc 28, the pole core 34, the gap between the pole core 34 and the armature 14, the armature 14 itself, and the projecting end position 40 of the valve housing 2.

The axial movement of the armature 14 causes the push rod 12 to be removed from the valve body 6 so that the valve body 6 is forced by the pressure present at the pressure connector P against the valve seat 10. The connection from the working connector A to the tank connector T is closed while the connection from the pressure connector P to the working connector A is opened. The pressure medium can flow from the pressure connector P through the open valve seat 8 and the penetrations 66 in the plastic sleeve 64 to the working connector A. The consumer is thus supplied with pressure medium. This consumer can be, for example, a cylinder which actuates an automated automobile transmission.

The valve is realized with negative overlap so that within a transition area all three connectors P, A, and T communicate with one another.

Thus, the present invention discloses a solenoid-actuated directional valve in which the valve seat is realized by a cup-shaped part which is inserted into the valve bore.

Figure 5:
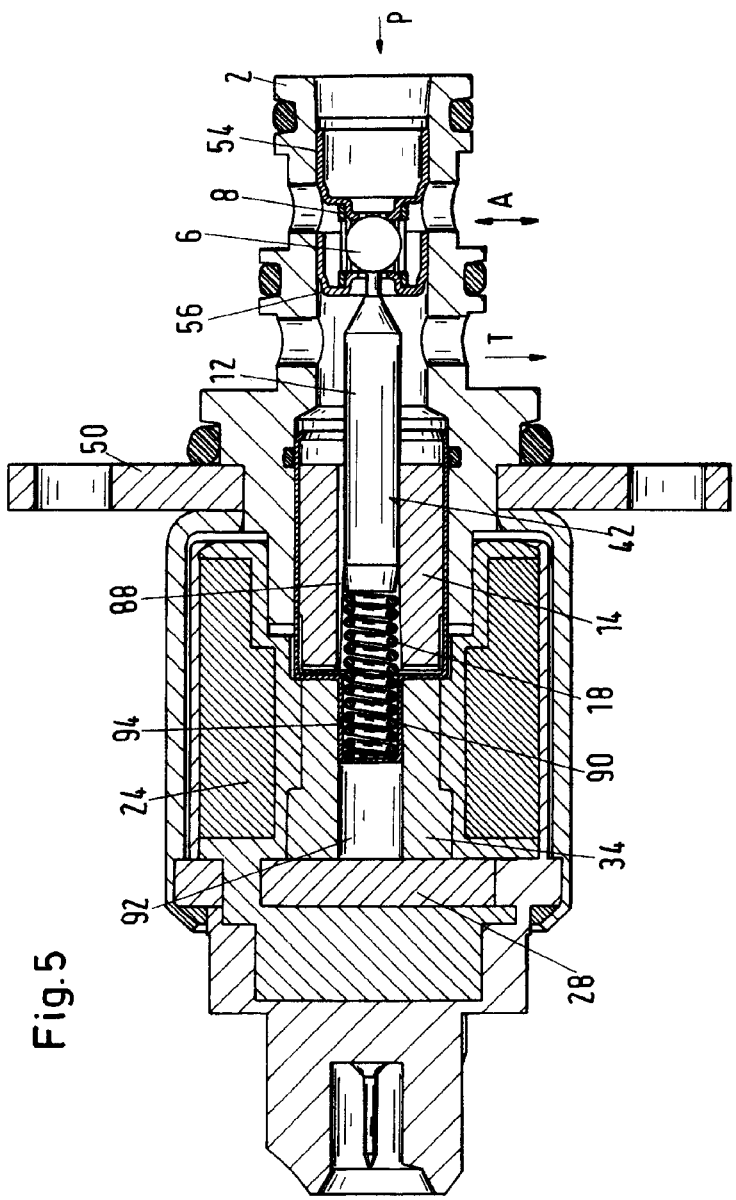
FIG. 5 is a second embodiment of the directly controlled directional seat valve according to the present invention.

The directional seat valve represented in FIG. 5 differs from the above disclosed embodiment in that the armature 14 and the push rod 12 are not an integral or monolithic part but are separate components. The armature 14 has a central bore 42 which penetrates the armature 14 axially and in which the push rod 12 is secured by press-fit. The wall of the central bore 42 has at least one longitudinal groove 88 by which the spring chamber 90, in which the pressure spring 18 is mounted, is connected to the tank connector T.

Since the armature 14 and the push rod 12 are separate components, the bias of the pressure spring 18 can be adjusted simply and precisely by pressing the push rod 12 into a force-dependent position.

The push rod 12 is forced into the armature 14 until the force of the pressure spring 18 upon contact of the armature 14 on the stop has reached a predetermined force. Thus, the adjusting tolerance for the pressure securing action is very minimal. Furthermore, cost savings are achieved in regard to the individual parts because reduced requirements with regard to coaxiality are to be met with respect to the bushing as well as the armature 14.

The pole core 34, in contrast to the previous embodiment, comprises an axial bore 92 penetrating it centrally. The cylindrical part 94 of the tube 32 projects into the bore 92. The part 94 is of a cup-shaped configuration. The pressure spring 18 rests against the bottom of the cylindrical part 94. The bottom is positioned at a spacing from the metal disc 28 against which the pole core 34 rests.

The directional valve is otherwise of the same configuration as the embodiment according to FIGS. 1 through 4.

While specific embodiments of the invention have been shown and described above in detail to illustrate the inventive principles, it will be understood that the invention may be embodied in different ways without departing from such principles.

What is claimed is:

1. A directional seat valve comprising:
   a valve housing (2) having a pressure connector (P) configured to supply a pressure medium to said valve housing, a tank connector (T) configured to return the pressure medium to a pressure medium tank, and a working connector (A) configured to supply the pressure medium to a working device;
   a valve bore (4) arranged in said valve housing (2);
   one or more shaped parts (54, 56) each configured to be press-fit into said valve bore (4) and each having a valve seat (8, 10);
   a valve body (6) arranged in said valve bore (4) and configured to cooperate with said valve seat (8, 10) of said one or more shaped parts (54, 56) for controlling flow of the pressure medium from said pressure connector (P) to at least one of said tank connector (T) and said working connector (A);
   a solenoid (16) connected to said valve housing (2) and configured to act on said valve body (6), wherein said valve body (6) is a single ball having opposed ends and wherein two of said shaped parts (54, 56) are press-fit into said valve bore (4) on said opposed ends of said valve ball (6), wherein said valve body (6) cooperates with said valve seats (8, 10) of said two shaped parts (54, 56), respectively, upon actuation by said solenoid (16) to selectively connect two or more of said pressure connector (P), said tank connector (T), and said working connector (A) to one another.

2. The directional seat valve according to claim 1, wherein said solenoid (16) has a push rod (12), extending into said valve bore (4) and acting on said valve body (6), and a pressure spring (18) biasing said push rod (12) into a contact position, wherein in said contact position said valve body (6) rests against a first one of said valve seats (8), positioned remote from said solenoid (16), and said push rod (12) extends through a second one of said valve seats (10).

3. The directional seat valve according to claim 2, wherein said solenoid (16) has a coil member (22) having a radially widened end portion (38a) facing said valve seats (8, 10), said housing (2) has a projecting end portion (40) penetrated by said push rod (12) and positioned remote from said valve seats (8, 10), and said projecting end portion (40) is received in said widened radial end portion (38a) of said coil member (22).

4. A directional seat valve comprising:
   a valve housing (2) having a pressure connector (P) configured to supply a pressure medium to said valve housing, a tank connector (T) configured to return the pressure medium to a pressure medium tank, and a working connector (A) configured to supply the pressure medium to a working device;
   a valve bore (4) arranged in said valve housing (2);
   one or more shaped parts (54, 56) each configured to be press-fit into said valve bore (4) and each having a valve seat (8, 10);
   a valve body (6) arranged in said valve bore (4) and configured to cooperate with said valve seat (8, 10) of said one or more shaped parts (54, 56) for controlling flow of the pressure medium from said pressure connector (P) to at least one of said tank connector (T) and said working connector (A);
   a solenoid (16) connected to said valve housing (2) and configured to act on said valve body (6), wherein two of said shaped parts (54, 56) are press-fit into said valve bore (4), wherein said valve body (6) cooperates with said valve seat (8, 10) of said two shaped parts (54, 56), respectively, upon actuation by said solenoid (16) to selectively connect two or more of said pressure connector (P), said tank connector (T), and said working connector (A) to one another;
   wherein said shaped part (54, 56) has a cup bottom (54b, 56b) and a cup sidewall (54a, 56a), wherein said cup bottom (54b) has an outwardly projecting portion (58)

extending, relative to said cup bottom (54*b*), in a direction away from said cup sidewall (54*a*) or an inwardly projecting portion (62) extending, relative to said cup bottom (56*b*), in a same direction as said cup sidewall (56*a*), wherein said valve seat (8, 10) is provided at said inwardly or outwardly projecting portions (58, 62), respectively.

5. The directional seat valve according to claim 4, wherein said shaped part (54, 56) is a cup-shaped deep-drawn sheet metal piece.

6. The directional seat valve according to claim 5, wherein said shaped part (54, 56) is made of sheet steel.

7. The directional seat valve according to claim 4, wherein said two shaped parts (54, 56) have a same orientation in said valve bore (4) with respect to said cup bottom.

8. The directional seat valve according to claim 4, wherein said shaped part (54, 56) has a slanted portion (60) connecting said cup bottom (54*b*, 56*b*) and said cup sidewall (54*a*, 56*a*).

9. The directional seat valve according to claim 4, wherein said valve body (6) is a valve ball.

10. A directional seat valve comprising:
    a valve housing (2) having a pressure connector (P) configured to supply a pressure medium to said valve housing, a tank connector (T) configured to return the pressure medium to a pressure medium tank, and a working connector (A) configured to supply the pressure medium to a working device;
    a valve bore (4) arranged in said valve housing (2);
    one or more shaped parts (54, 56) each configured to be press-fit into said valve bore (4) and each having a valve seat (8, 10);
    a valve body (6) arranged in said valve bore (4) and configured to cooperate with said valve seat (8, 10) of said one or more shaped parts (54, 56) for controlling flow of the pressure medium from said pressure connector (P) to at least one of said tank connector (T) and said working connector (A);
    a solenoid (16) connected to said valve housing (2) and configured to art on said valve body (6), wherein two of said shaped parts (54, 56) are press-fit into said valve bore (4), wherein said valve body (6) cooperates with said valve seat (8, 10) of said two shaped parts (54, 56), respectively, upon actuation by said solenoid (16) to selectively connect two or more of said pressure connector (P), said tank connector (T), and said working connector (A) to one another;
    further comprising a guide sleeve (64) positioned between said two shaped parts (54, 56), wherein said valve body (6) is moveably arranged in said guide sleeve (6), and wherein said guide sleeve (64) has perforations (66) configured to allow the pressure medium to pass into and out of the guide sleeve (64).

11. The directional seat valve according to claim 10, wherein said guide sleeve (64) has opposed ends and wherein said opposed ends rest against said inwardly and said outwardly projecting portions (58, 62), respectively.

* * * * *